(12) United States Patent
Bae et al.

(10) Patent No.: US 12,033,406 B2
(45) Date of Patent: Jul. 9, 2024

(54) METHOD AND DEVICE FOR IDENTIFYING PRESENCE OF THREE-DIMENSIONAL OBJECTS USING IMAGES

(71) Applicant: CUPIX, INC., Gyeonggi-do (KR)

(72) Inventors: SeockHoon Bae, Seoul (KR); Jun Young Park, Gyeonggi-do (KR)

(73) Assignee: CUPIX, INC., Gyeonggi-do (KR)

( * ) Notice: Subject to any disclaimer, the term of this patent is extended or adjusted under 35 U.S.C. 154(b) by 385 days.

(21) Appl. No.: 17/560,141

(22) Filed: Dec. 22, 2021

(65) Prior Publication Data

US 2022/0343661 A1    Oct. 27, 2022

(30) Foreign Application Priority Data

Apr. 22, 2021  (KR) .................. 10-2021-0052127

(51) Int. Cl.
*G06V 20/64*  (2022.01)
*G06F 18/21*  (2023.01)
*G06T 7/20*  (2017.01)
*G06T 7/70*  (2017.01)
*G06T 11/00*  (2006.01)
*G06V 10/24*  (2022.01)
*G06V 10/74*  (2022.01)

(52) U.S. Cl.
CPC ............ *G06V 20/647* (2022.01); *G06F 18/21* (2023.01); *G06T 7/20* (2013.01); *G06T 7/70* (2017.01); *G06T 11/00* (2013.01); *G06V 10/24* (2022.01); *G06V 10/761* (2022.01); *G06T 2200/04* (2013.01); *G06T 2207/20081* (2013.01); *G06T 2207/20084* (2013.01); *G06T 2210/04* (2013.01)

(58) Field of Classification Search
CPC .... G06V 20/647; G06V 10/24; G06V 10/761; G06V 20/64; G06V 20/36; G06F 18/21; G06T 7/20; G06T 7/70; G06T 11/00; G06T 2200/04; G06T 2207/20081; G06T 2207/20084; G06T 2210/04; G06T 7/0008; G06T 7/73
See application file for complete search history.

(56) References Cited

U.S. PATENT DOCUMENTS

| | | |
|---|---|---|
| 5,990,900 A | 11/1999 | Seago |
| 6,278,460 B1 | 8/2001 | Myers et al. |
| 7,508,977 B2 | 3/2009 | Lyons et al. |
| 8,825,452 B2 | 9/2014 | Shono et al. |
| 8,947,423 B2 | 2/2015 | Ocali et al. |
| 9,558,584 B1 | 1/2017 | Lo et al. |
| 10,282,913 B2 | 5/2019 | Kellogg et al. |
| 10,572,736 B2 | 2/2020 | Uchiyama et al. |
| 10,706,321 B1 | 7/2020 | Chen et al. |

(Continued)

FOREIGN PATENT DOCUMENTS

KR  20140135513  11/2014

*Primary Examiner* — Jianxun Yang
(74) *Attorney, Agent, or Firm* — JCIPRNET (57) ABSTRACT

Provided are a method and apparatus for identifying the presence of a 3D object using an image. According to the method and the apparatus, two-dimensional images are used to identify whether a 3D object exists in the images. According to the method and apparatus for identifying the presence of a 3D object by using an image, the presence of a 3D object in space can be accurately and quickly identified by using two-dimensional images, leading to higher productivity.

13 Claims, 4 Drawing Sheets

(56) References Cited

U.S. PATENT DOCUMENTS

| | | |
|---|---|---|
| 10,733,755 B2 | 8/2020 | Liao et al. |
| 10,825,198 B2 | 11/2020 | Bae |
| 10,977,857 B2 | 4/2021 | Bae et al. |
| 2004/0247174 A1 | 12/2004 | Lyons et al. |
| 2015/0097829 A1 | 4/2015 | Algreatly |
| 2015/0237325 A1 | 8/2015 | Angot et al. |
| 2016/0154994 A1* | 6/2016 | Kim .................. G06V 40/165 |
| | | 382/118 |
| 2018/0101732 A1 | 4/2018 | Uchiyama et al. |
| 2018/0247430 A1 | 8/2018 | Koga et al. |
| 2019/0026917 A1 | 1/2019 | Liao et al. |
| 2019/0026948 A1 | 1/2019 | Kellogg et al. |
| 2019/0392609 A1* | 12/2019 | Bae ........................ G06T 7/74 |
| 2020/0394809 A1 | 12/2020 | Bae et al. |

* cited by examiner

METHOD AND DEVICE FOR IDENTIFYING PRESENCE OF THREE-DIMENSIONAL OBJECTS USING IMAGES

CROSS REFERENCE TO RELATED APPLICATION

This application is based on and claims priority under 35 U.S.C. § 119 to Korean Patent Application No. 10-2021-0052127, filed on Apr. 22, 2021, in the Korean Intellectual Property Office, the disclosure of which is incorporated by reference herein in its entirety.

TECHNICAL FIELD

The present disclosure relates to a method and an apparatus for identifying the presence of a three-dimensional (3D) object by using an image.

DESCRIPTION OF RELATED ART

There has been demands in various technical fields to determine whether a 3D object exists in space or to determine whether the object is located at a predetermined location.

For example, in the field of architecture, such tasks could be required in order to identify the progress of a building construction as it is necessary to identify whether the building project has been progressing as designed and to determine to what extent the actual construction has progressed based on the design.

Identifying the progress of a construction could be a frequently occurring task, regarded as a management evaluation criteria of a construction project, and an essential procedure for billings and settlements of the construction costs of subcontractors or for checking construction results. Conventionally, a person would visit a construction site and perceive with naked eyes to determine whether a building project has been constructed with the same design drawings by performing actual measurements or surveys. Such task performed manually by humans may require a lot of time and effort and high costs. Therefore, if the tasks of comparing the design drawings with the actual construction and identifying the construction progress can be performed automatically, then a lot of time, efforts, and costs can be saved.

In recent years, the design, construction, and management of buildings are all centered on a 3D building information model (BIM) resulting in drastic improvements of productivities and efficiencies. For this reason, in the case of new constructions, the rate of implementing 3D BIM starting from the design stage has been gradually increasing. In addition, BIM has been used as a basic building representation database even in an efficiency improvement system of city operations based on a digital model of an entire city, such as a smart city.

Therefore, if the task as described above is applied to, for example, BIM, and images captured in the field is compared with a BIM model to automatically determine whether a specific 3D model exists in the obtained image, a lot of time and costs could be reduced and productivities could be improved.

SUMMARY

In order to achieve some of the above described advantages, the disclosure provides a method and an apparatus for identifying the presence of a 3D object by using an image.

In an aspect, the disclosure provides a method of identifying the presence of a 3D object by using an image. The method may include not limited to: (a) receiving, by an image receiving module, a plurality of photographic images, and obtaining a position, orientation, and projection center point of each of the plurality of photographic images; (b) receiving, by an object receiving module, a 3D model of a target object; (c) receiving, by the object receiving module, coordinates and orientation of the target object as object coordinates and an object orientation; (d) arranging, by a spatial arrangement module, the plurality of photographic images in a 3D space according to the position and the orientation thereof, and arranging the 3D model of the target object in a 3D space according to the object coordinates and the object orientation; (e) generating, by a projection module, a plurality of inspection projection images by projecting the plurality of photographic images arranged in step (d) on the surface of the 3D model of the target object arranged in step (d); (f) determining, by a similarity determination module, whether the inspection projection images generated in step (e) has similarity therebetween; and (g) determining, by an object inspection module, that the target object is present in the photographic images, when the similarity determination module determines that the inspection projection images are similar to each other in step (f).

In an aspect, the disclosure provides an apparatus for identifying the presence of a 3D object by using an image. The apparatus may include not limited to: an image receiving module for receiving a plurality of photographic images and obtaining a position, orientation, and projection center point of each of the plurality of photographic images; an object receiving module for receiving a 3D model of a target object and receiving coordinates and orientations of the target object as object coordinates and object orientation; a spatial arrangement module for arranging the plurality of photographic images in a 3D space according to the position and the orientation thereof, and arranging the 3D model of the target object in a 3D space according to the object coordinates and the object orientation; a projective module for generating a plurality of inspection projection images by projecting each of the plurality of photographic images, arranged by the spatial arrangement module, on the surface of the 3D model of the target object; a similarity determination module for determining whether the inspection projection images generated by the projective module have image similarity to each other; and an object inspection module which determines that the target object is present in the photographic images in a case where the similarity determination module determines that the inspection projection images are similar to each other.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also, the present disclosure would include improvements and modifications which are obvious to one skilled in the art.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Hereinafter, a method and an apparatus for identifying the presence of a 3D (3D) object using an image according to an embodiment of the present disclosure will be described with reference to the accompanying drawings.

Figure 1:
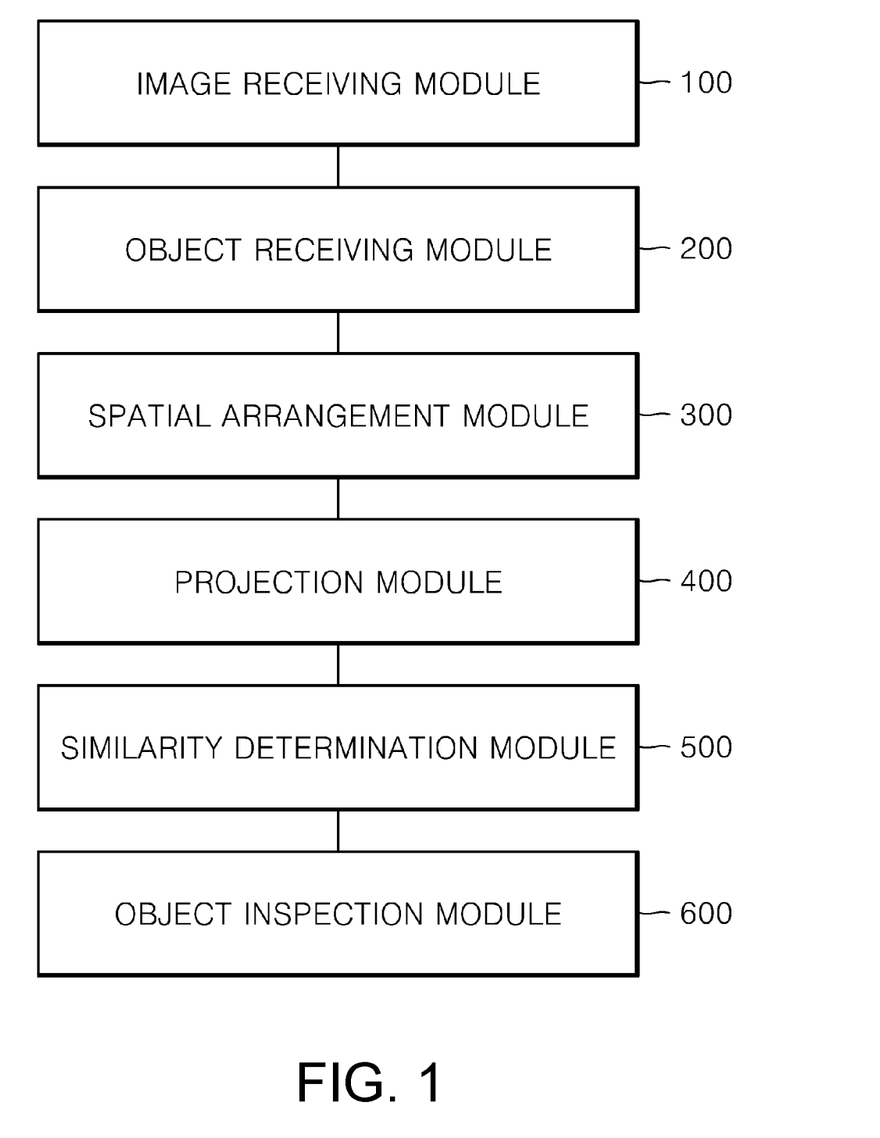
FIG. 1 shows a block diagram of an apparatus for identifying the presence of a 3D object by using an image according to an embodiment of the present disclosure.

FIG. 1 shows a block diagram of an apparatus for identifying the presence of a 3D object by using an image according to an embodiment of the present disclosure.

A method and apparatus for identifying the presence of a 3D object using an image of the present disclosure are used to automatically identify whether a target object exists in a two-dimensional photographic image taken by using a camera or obtained by using various other methods.

Referring to FIG. 1, the apparatus for identifying the presence of a 3D object using an image according to the present embodiment includes not limited to an image receiving module 100, an object receiving module 200, a spatial arrangement module 300, a projective evaluation module 400, a similarity determination module 500, and an object inspection module 600. The above described modules 100~600 could be implemented by a hardware processor such as a central processing unit (CPU), a graphics processing unit (GPU), and etc.

The image receiving module 100 may receive a plurality of photographic images. The image receiving module 100 may obtain the position, orientation, and projection center point of each of the plurality of photographic images.

When receiving a plurality of photographic images, the image receiving module 100 may receive the position, orientation, and projection center point of each photographic image together. Alternatively, the image receiving module 100 may also analyze the photographic images to calculate the position, orientation, and projection center point of each photographic image.

For example, the image receiving module 100 may use a computer vision or a structure from motion (SfM) method to calculate the position, orientation, and projection center point of each photographic image in a 3D space. The SfM method is a technology that calculates the 3D coordinates and orientation of the camera at the time of taking each photographic image by analyzing only the photographic image. At this time, the image receiving module 100 may calculate the position, orientation, and projection center point of each photographic image by using a camera intrinsic parameter such as the relative position between the projection center point and the projection surface of a digital camera, with which photographic images are taken, and the size of the projection surface (a CMOS image sensor, a CCD image sensor, etc.).

The image receiving module 100 may calculate the positions and orientations of the photographic images by using sensor measurement values obtained by using, for example, an inertial measurement sensor and an acceleration sensor at the time of taking the photographic images. When taking an image with the camera, the position and orientation of the camera can be calculated by using a change amount in the measurement values obtained by using various types of sensors, such as an inertial measurement unit (IMU), an acceleration sensor, a geomagnetic sensor, and an angular displacement sensor, or measurement values obtained over time. For example, since a change in displacement can be calculated by integrating the acceleration twice, the position and orientation of the camera can be more accurately or quickly calculated by using the values calculated in this manner. As such, when the position and orientation of the camera is used, it is possible to obtain the position and orientation of the photographic image in 3D space.

In an embodiment, the image receiving module 100 may calculate the position and orientation of the photographic images by using the computer vision or SfM method and measurement values of various sensors in combination.

In one or more embodiments, the image receiving module 100 may receive, together with the photographic images, the values obtained by calculating the positions and orientations of the photographic images by a separate configuration in the same manner as described above.

The positions and orientations of the photographic images may also be obtained using various other methods such as visual odometry, simultaneous localization and mapping (SLAM), and machine learning, in addition to such methods as described above.

Also, the image receiving module 100 may obtain the positions and orientations of the photographic images by aligning the 3D scan data and the photographic images or by extracting the photographic images in the form of a two-dimensional image from the 3D scan data.

Meanwhile, the photographic images received by the image receiving module 100 may be those taken by a digital camera or may be image frames of a moving picture.

The object receiving module 200 may receive the 3D model of the target object, of which presence in the photographic images received by the image receiving module 100 is to be identified, and the coordinates and orientation of the target object in 3D space. Hereinafter, the coordinates and direction of the target object will be referred to as object coordinates and an object orientation, respectively.

The 3D model of the target object may be prepared in various ways and input to the object receiving module 200. For example, the object receiving module 200 may receive a 3D model that is obtained by modeling using 3D authoring software such as Revit, ArchiCAD, SketchUp, Inventor, SolidWorks, etc. In some cases, the object receiving module 200 may receive a 3D model in a form converted from a two-dimensional (2D) drawing into a 3D model or a 3D model obtained by a 3D scanner.

While receiving the 3D model of the target object, the object receiving module 200 receives the position and orientation to check whether the target object exists in 3D space as object coordinates and an object orientation, respectively. As for the object coordinates and the object orientation, the object receiving module 200 may receive a value input by a user using an input device, and the object receiving module 200 may receive from database in which information about the target object is stored.

Figure 3:
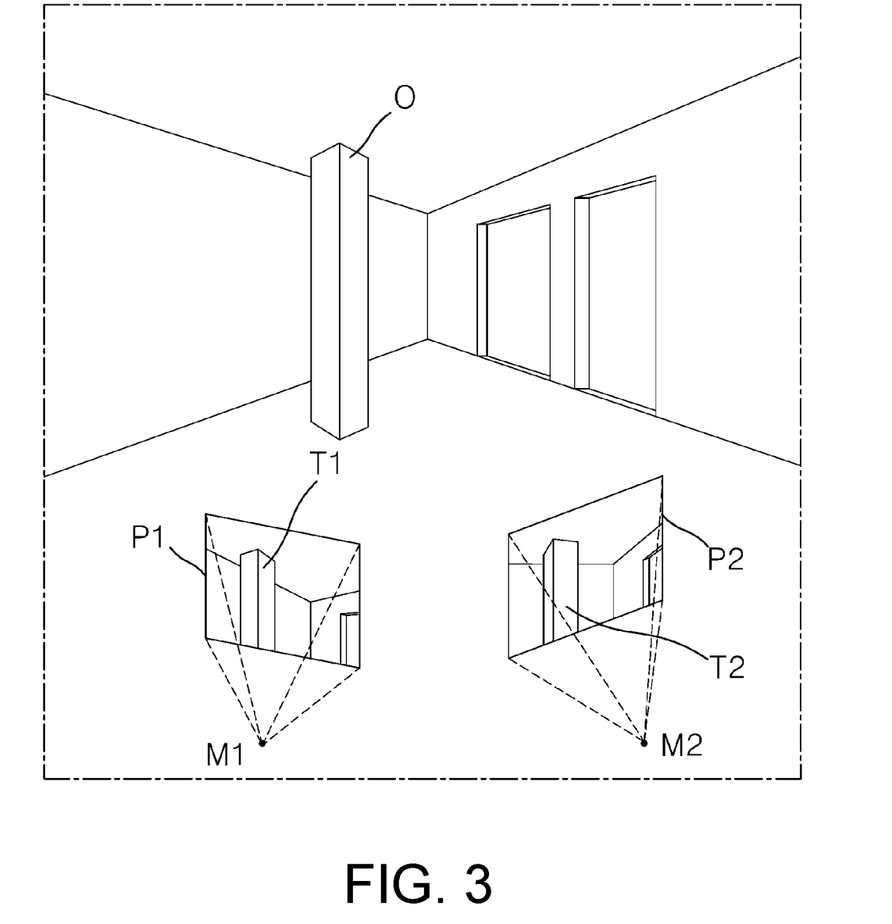
FIGS. 3 and 4 show diagrams for illustrating the method of identifying the presence of a 3D object using an image described in connection with FIG. 1 and the apparatus for identifying the presence of a 3D object using an image with reference to FIG. 2.

The spatial arrangement module 300 arranges photographic images P1 and P2 and a target object O in 3D space. The spatial arrangement module 300 may arrange the photographic images P1 and P2 received by the image receiving module 100 in a 3D space according to the positions and orientations thereof as illustrated in FIG. 3. In addition, the spatial arrangement module 300 may arrange the 3D model of the target object O in 3D space according to the object coordinates and the object orientation.

Figure 4:
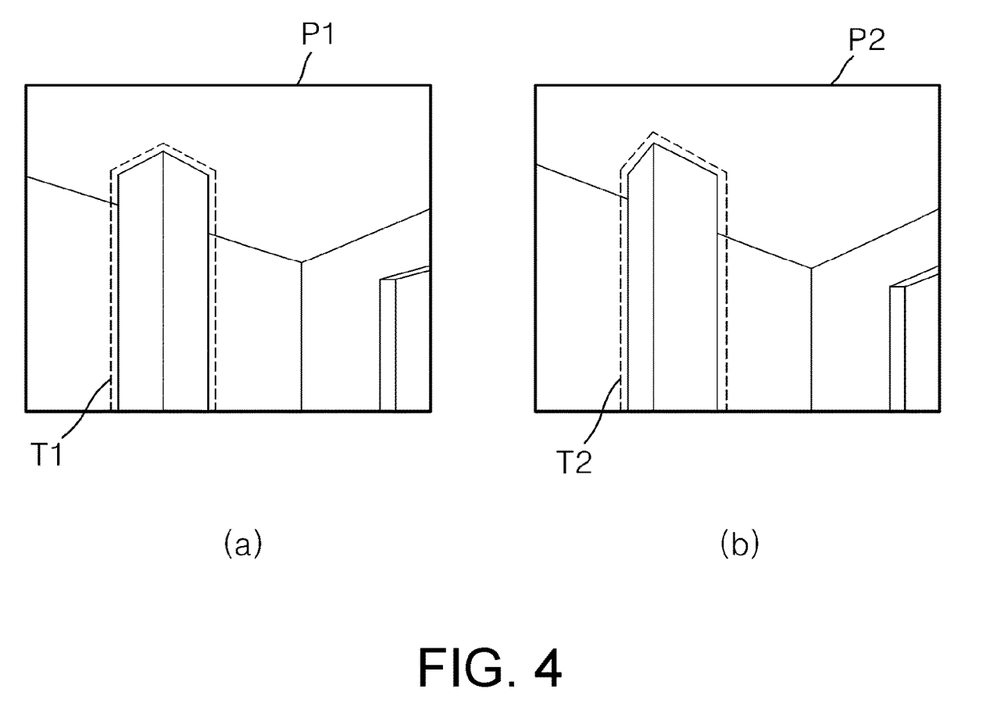

The projective module 400 may project the photographic images P1 and P2 arranged by the spatial arrangement module 300 on the surface of the 3D model of the target object O arranged by the spatial arrangement module 300 so as to generate inspection projection images T1 and T2, respectively. The projective module 400 may project, with respect to all the pixels of the photographic images P1 and P2, from projection center points M1 and M2 of the camera to the position of each pixel so as to generate the inspection projection images T1 and T2 projected onto the surface of the target object O. Through the same process as described above with respect to each of the photographic images P1 and P2, the projective module 400 may generate the inspection projection images T1 and T2 projected with respect to the target object O on each of the photographic images P1 and P2. FIG. 4 shows a diagram illustrating the inspection projection images T1 and T2 generated with respect to the target object O, which has a column-shape, in photographic images P1 and P2, respectively, wherein the inspection projection images T1 and T2 are illustrated with dotted lines.

A similarity determination module 500 determines whether the inspection projection images T1 and T2 generated by the projective module 400 has an image similarity. As a method of determining whether the inspection projection images T1 and T2 has the image similarity, various known methods may be used. For example, the image similarity of the inspection projection images may be determined using computer vision, deep learning method, or convolutional neural network (CNN) method. When the result of the image similarity measured exceeds a preset reference value or threshold, the similarity determination module 500 may determine that the inspection projection images T1 and T2 are similar to each other.

When the similarity determination module 500 determines that the inspection projection images T1 and T2 are similar to each other, an object inspection module 600 may determine that the target object O exists in the photographic images P1 and P2. When it is determined that the inspection projection images T1 and T2 are similar to each other, this result indicates that the target object O exists in the object orientation at the object coordinates of the space of which an image is actually taken. When the target object O is actually photographed at the object coordinates and in the object orientation, the appearance of the target object O exists in the inspection projection image. Even with respect to the photographic images P1 and P2 taken in different positions and orientations, the inspection projection images T1 and T2 obtained by photographing a scene including the target object O may have an image similarity. Therefore, when the inspection projection images T1 and T2 are examined by the similarity determination module 500, it is determined that there is an image similarity. When the photographic images P1 and P2 are photographed while the target object O is present therein, there may be differences in image similarity between the inspection projection images depending on the location and orientation of each photographic image. However, the similarity determination module 500 may perform the image similarity determination operation in consideration of the positions and directions of the photographic images P1 and P2.

When the target object O does not exist in the space in the obtained photographic images, the inspection projection images created by the projective module 400 contain a completely different object (the appearance of a wall in the background or other objects) that is not related to the target object. Inspection projection images obtained from photographic images taken in different positions and orientations inevitably include the appearance or shape of a completely different object. Therefore, the inspection projection images which do not contain the target object, are not similar to each other. As a result, the object inspection module 600 may determine that the target object does not exist.

Figure 2:
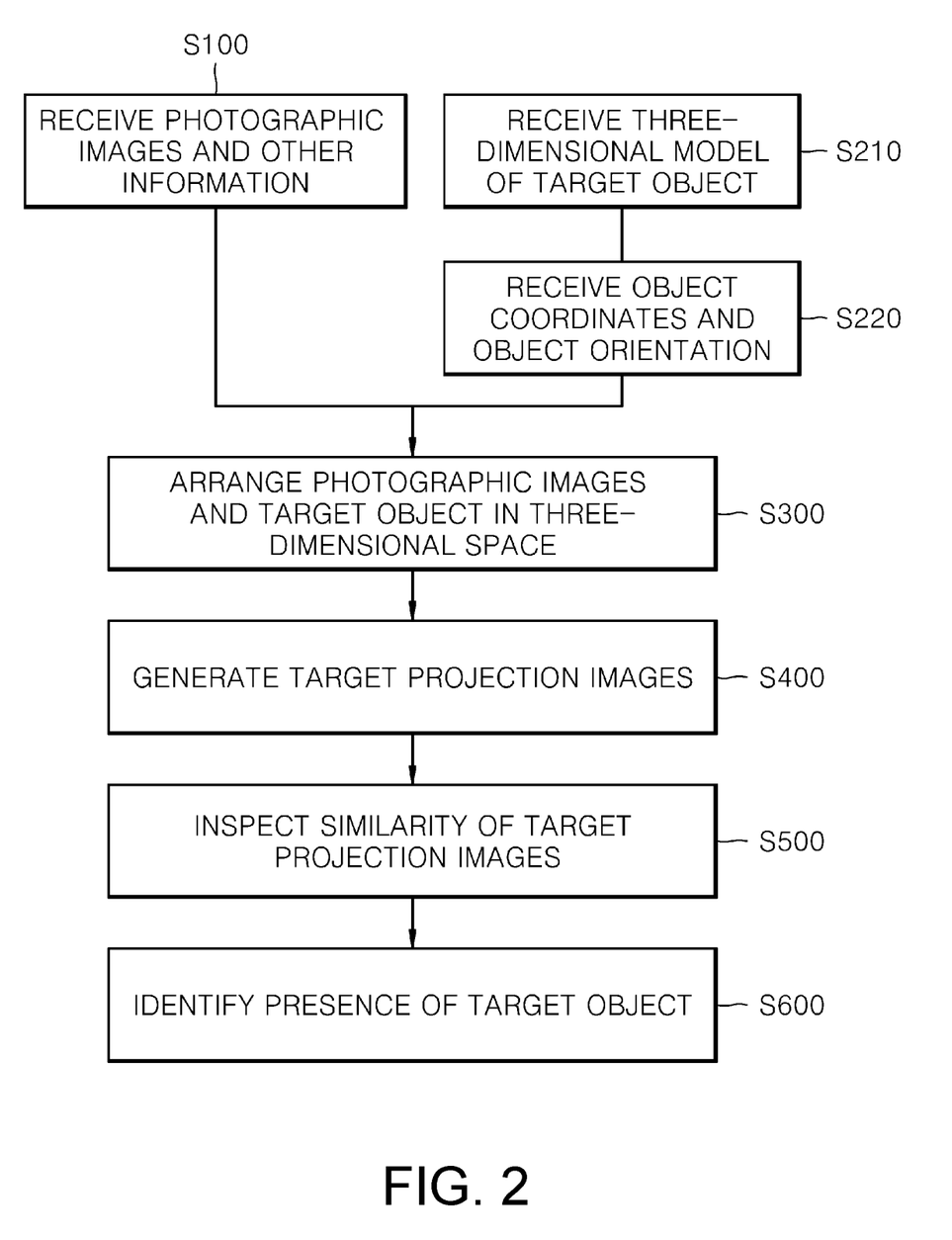
FIG. 2 shows a flowchart for illustrating a process of performing a method of identifying the presence of a 3D object using an image according to the present disclosure, by using the apparatus for identifying the presence of a 3D object using the image shown in FIG. 1.

Hereinafter, a process of implementing an example of a method of identifying the presence of a 3D object using an image according to the present disclosure by using the apparatus for identifying the presence of a 3D object using an image, will be described with reference to FIG. 2.

First, the image receiving module 100 receives a plurality of photographic images, and obtains the position, orientation, and projection center point of each of the photographic images (step (a); S100). As described above, the positions, orientations, and projection center points of the photographic images may be calculated using the photographic images, or the image receiving module 100 may receive a pre-calculated or predetermined value.

Separately from the image receiving module 100, the object receiving module 200 receives a 3D model of the target object (step (b); S210). In addition, the object receiving module 200 receives the object coordinates and the object orientation of the target object corresponding to the coordinate and orientation thereof, respectively (step (c); S220).

As described above, the 3D model of the target object may be modeled by a 3D authoring tool, or obtained by using a 3D scanner or image processing of two-dimensional images. The object coordinates and the object orientation are the position and the orientation to check whether the target object is actually located in the photographed space. When the target object is positioned in the object orientation at the object coordinates of the photographed space, the appearance and shape of the target object are included and displayed in the photographic image along with the surrounding composition.

The spatial arrangement module 300 may arrange the photographic images P1 and P2 and the target object O in 3D space by using the 3D model of the target object O and the photographic images P1 and P2 prepared in this manner (step (d); S300).

Such a state is schematically illustrated in FIG. 3. FIG. 3 illustrates the target object O, which has a column-shape, arranged in 3D space within a building. In addition, the drawing also illustrates: two photographic images P1 and P2 each containing the target object O and the surrounding thereof; and the projection center points M1 and M2 from which the photographic images P1 and P2 are obtained. The spatial arrangement module 300 arranges the photographic images P1 and P2 in 3D space according to the position and orientation of each of the photographic images P1 and P2 obtained by the image receiving module 100. In addition, the spatial arrangement module 300 may arrange the 3D model of the target object O in 3D space according to the object coordinates and the object orientation.

In this state, the projective module 400 generates inspection projection images by projecting the photographic images P1 and P2 on the surface of the target object O, respectively (step (e); S400). As described above, the projective module 400 may project, with respect to all the pixels of the photographic images P1 and P2, from projection center points M1 and M2 of the camera to the position of each pixel so as to generate the inspection projection images projected onto the surface of the target object O. Through the same process as described above with respect to each of the photographic images P1 and P2, the projective module 400 may generate the inspection projection images projected with respect to the target object O on each of the photographic images P1 and P2. FIG. 4 illustrates regions of the inspection projection images T1 and T2 with respect to the target object O in the photographic images P1 and P2, respectively.

The similarity determination module 500 determines whether there is an image similarity between the inspection projection images T1 and T2 generated by the projective module 400 (step (0; S500). The similarity determination module 500 may use various methods such as a computer vision method, a deep learning method, and a CNN method to determine whether the inspection projection images T1 and T2 are similar.

When the result of the image similarity measured exceeds a preset reference value or threshold, the similarity determination module 500 may determine that the inspection projection images T1 and T2 are similar to each other.

The object inspection module 600 may determine whether the target object O exists in the photographic images P1 and P2 based on the determined result of the similarity determination module 500 (step (g); S600).

When the target object O exists and the photographic images P1 and P2 contain the same, the inspection projection images T1 and T2 obtained by photographing the same target object O are to be similar to each other. Accordingly, when the inspection projection images T1 and T2 are similar to each other, the object inspection module 600 may determine that the target object exists.

When the target object O did not exist at the time of photographing, even when the photographic images are projected onto the 3D model of the target object O, an image that is completely irrelevant to the target object O will be created as the inspection projection images. In particular, in the case of photographic images taken from different directions and angles, completely different objects are created as inspection projection images. For example, when the column on the table is the target object O, in the case where the target object O does not exist, the inspection projection images may contain images with different backgrounds (walls, doors, furniture, etc.). Therefore, the image similarity determination result of the similarity determination module 500 is no similarity. As such, the object inspection module 600 determines that target object O does not exist.

According to the present disclosure, the presence or absence of a target object in space can be easily and quickly automatically identified by the method as described above.

The method and apparatus for identifying the presence of a 3D object using an image of the present disclosure as described above can be effectively used for the purpose of identifying the progress of construction of a building project. The construction progress rate can be identified by a system only by using a picture of the site, without the need for a construction manager to visit the site and, with the naked eye, compare the same with the design drawings. The progress of the construction can be easily identified by inputting photographic images of the construction site and inputting the architectural design model data as a target object. The present disclosure can be effectively used as a measure for identifying the actual progress rate of a building project or for billing and settlement of monthly expenses provided to a subcontractor, according to the progress status.

In addition, according to the method and apparatus for identifying the presence of a 3D object using an image according to the present disclosure, the change in a building or space could be easily identified by using only photographing or video recording data alone. Moreover, the present disclosure may also be used to easily determine whether a building or equipment is damaged or deformed, for the purpose of maintenance of various buildings or products.

In the above, the present disclosure has been described with reference to embodiments, but the scope of the present disclosure is not limited to the above-described and illustrated configurations.

For example, in the previous embodiment, the image receiving module 100 receives and uses a photographic image obtained by photographing. However, the photographic image used according to the present disclosure may be a moving image frame obtained by video photographing or other various two-dimensional images.

In addition, the present disclosure may be performed by adding a step of determining whether the received photographic image is a photographic image of a space including the location of the target object and selecting such an image. In this case, the presence or absence of the target object is identified using only photographic images including the location of the target object.

In addition, as a method of identifying the image similarity of inspection projection images, various methods other than the computer vision method, deep learning method, and CNN method may be used.

In addition, in one or more embodiments, the present disclosure may be performed in such a manner that from among photographic images, photographic images, of which photographing angles are similar to each other and are within a certain angle range, are selected and then the identifying the presence of the target object is performed only on the selected images.

The present disclosure can be implemented using at least two photographic images. In one or more embodiments, three or more photographic images may be used to determine the presence of the target object.

According to the method and apparatus for identifying the presence of a 3D object by using an image according to the present disclosure, the presence of a 3D object in space can be accurately and quickly identified by using two-dimensional images, leading to higher productivity.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of identifying the presence of a three-dimensional (3D) object using an image, the method comprising:
    (a) receiving, by an image receiving module, a plurality of photographic images, and obtaining a position, orientation, and projection center point of each of the plurality of photographic images so as to obtain the positions and orientations of the plurality of photographic images;
    (b) receiving, by an object receiving module, a 3D model of a target object;
    (c) receiving, by the object receiving module, coordinates and an orientation of the target object as object coordinates and an object orientation;
    (d) arranging, by a spatial arrangement module, the plurality of photographic images in a 3D space according to the positions and the orientations, and arranging the 3D model of the target object in a 3D space according to the object coordinates and the object orientation;
    (e) generating, by a projection module, a plurality of inspection projection images by projecting the plurality of photographic images arranged in step (d) on a surface of the 3D model of the target object arranged in step (d);
    (f) determining, by a similarity determination module, whether the inspection projection images generated in step (e) are similar therebetween; and
    (g) determining, by an object inspection module, that the target object is present in the photographic images, when the similarity determination module has determined that the inspection projection images are similar to each other in step (f).

2. The method of claim 1, wherein
in step (a), after receiving the plurality of photographic images, the image receiving module calculates the position, orientation, and projection center point of the plurality of photographic images by using any one method of a computer vision and structure from motion (SfM) to obtain the positions and orientations of the plurality of photographic images.

3. The method of claim 1, wherein
in step (a), after receiving the plurality of photographic images, the image receiving module calculates the positions and orientations of the photographic images by using measurement values of an inertial measurement unit (IMU) stored at the time when the plurality of photographic images are taken, so as to obtain the position, orientation, and projection center point of the plurality of photographic images.

4. The method of claim 1, wherein
in step (a), the image receiving module receives the plurality of photographic images simultaneously together with the position, orientation, and projection center point of each of the photographic images.

5. The method of claim 4, wherein
in step (f), the similarity determination module determines the image similarity of the inspection projection images by using one of a computer vision method and a deep learning method.

6. The method of claim 1, wherein
in step (f), the similarity determination module determines the image similarity of the inspection projection images by using one of a computer vision method and a deep learning method.

7. An apparatus for identifying the presence of a three-dimensional (3D) object by using an image, the apparatus comprising:
    an image sensor, and
    a hardware processor connected to the image sensor and configured to:
    receive, from the image sensor, a plurality of photographic images and obtaining a position, orientation, and projection center point of each of the plurality of photographic images so as to obtain the positions and orientations of the plurality of photographic images;
    receive a 3D model of a target object and receiving coordinates and orientations of the target object as object coordinates and object orientation;
    arrange the plurality of photographic images in a 3D space according to the positions and the orientations, and arranging the 3D model of the target object in a 3D space according to the object coordinates and the object orientation;
    generate a plurality of inspection projection images by projecting each of the plurality of photographic images, arranged by the spatial arrangement module, on a surface of the 3D model of the target object;
    determine whether the inspection projection images generated by the projection module are similar to each other; and
    determine that the target object is present in the photographic images in a case where the similarity determination module has determined that the inspection projection images are similar to each other.

8. The apparatus of claim 7, wherein
after receiving the plurality of photographic images, the hardware processor is further configured to calculate the position, orientation, and projection center point of each of the plurality of photographic images by using any one method of a computer vision and structure-from-motion (SfM) to obtain the positions and orientations of the plurality of photographic images.

9. The apparatus of claim 7, wherein
after receiving the plurality of photographic images, the hardware processor is further configured to calculate the positions, orientations, and projection center points of the photographic images by using measurement values of an inertial measurement unit (IMU) stored at the time when the plurality of photographic images are taken, so as to obtain the position and orientation of the plurality of photographic images.

10. The apparatus of claim 7, wherein
the hardware processor is further configured to receive, from the image sensor, the plurality of photographic images simultaneously together with the position, orientation, and projection center point of each of the photographic images.

11. The apparatus of claim 7, wherein
the hardware processor is configured to determine the image similarity of the inspection projection images by using one of a computer vision method and a deep learning method.

12. The apparatus of claim 11, wherein
the hardware processor is configured to determine the image similarity of the inspection projection images by using one of a computer vision method and a deep learning method.

13. The apparatus of claim 7, wherein
the hardware processor is configured to determine the image similarity of the inspection projection images by using one of a computer vision method and a deep learning method.

* * * * *